(12) United States Patent
Keohane et al.

(10) Patent No.: US 7,512,887 B2
(45) Date of Patent: Mar. 31, 2009

(54) METHOD TO EMPLOY MULTIPLE, ALTERNATIVE PRESENTATIONS WITHIN A SINGLE PRESENTATION

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 10/896,502

(22) Filed: Jul. 22, 2004

(65) Prior Publication Data

US 2006/0020895 A1    Jan. 26, 2006

(51) Int. Cl.
    *G06F 3/00* (2006.01)
(52) U.S. Cl. ............... 715/732; 715/730; 715/731
(58) Field of Classification Search ........... 715/731, 715/730, 732
    See application file for complete search history.

(56) References Cited

U.S. PATENT DOCUMENTS

| | | | | |
|---|---|---|---|---|
| 5,859,623 A | * | 1/1999 | Meyn et al. | 715/730 |
| 6,108,001 A | * | 8/2000 | Tuttle | 715/730 |
| 2001/0033296 A1 | * | 10/2001 | Fullerton et al. | 345/730 |
| 2003/0222890 A1 | * | 12/2003 | Salesin et al. | 345/629 |
| 2004/0017390 A1 | * | 1/2004 | Knowlton et al. | 345/731 |
| 2005/0086200 A1 | * | 4/2005 | Kirkman et al. | 707/2 |
| 2005/0160368 A1 | | 7/2005 | Liu et al. | 715/762 |
| 2005/0273693 A1 | * | 12/2005 | Peterson | 715/500.1 |
| 2007/0055939 A1 | * | 3/2007 | Furlong et al. | 715/731 |

OTHER PUBLICATIONS

Ozsoyoglu, Gultekin, Automating the Assembly of Presentation from Multimedia Databases, 1996, Case WEstern Reserver University, pp. 593-601.*

* cited by examiner

*Primary Examiner*—Kieu D Vu
*Assistant Examiner*—Dennis Bonshock
(74) *Attorney, Agent, or Firm*—Casimer K. Salys; Jack V. Musgrove

(57) ABSTRACT

A method of creating multiple, alternative presentations within a single electronic presentation, by assigning one or more presentation constraint parameters to the electronic slides, and generating a sequence for presenting less than all of the electronic slides based on the presentation constraint parameters. Different sequences can be generated using different presentation constraint parameters that are assigned to the electronic slides. For example, a first electronic slide could be included in a first sequence, and a second electronic slide (or multiple slides) can be substituted for the first electronic slide in a second sequence. A sequence can be generated by adjusting a scalable constraint associated with the presentation constraint parameters to determine which electronic slides to include. The presentation constraint parameters can include a time factor and a content level.

15 Claims, 6 Drawing Sheets

METHOD TO EMPLOY MULTIPLE, ALTERNATIVE PRESENTATIONS WITHIN A SINGLE PRESENTATION

BACKGROUND OF THE INVENTION

1. Field of the Invention

The present invention generally relates to data processing systems, specifically electronic presentations, and more particularly to a method of imparting greater flexibility in carrying out an electronic presentation.

2. Description of the Related Art

Electronic presentations have quickly overtaken slideshows and overhead projectors as the preferred medium for business communications. It has become a fairly simple matter for anyone with minimal computer proficiency to create, manage and present electronic slides using a computer and projection device. FIG. 1 illustrates a typical setup for an electronic presentation. An electronic presentation system 2 includes a computer workstation 3 connected to a projection device 4. Computer workstation 3 may be a stand-alone computer system (like personal computers, or PCs), or a special-purpose unit adapted for limited use with projection device 4. As used herein, "PC" generally refers to any multi-purpose computer adapted for use by one or more individuals, regardless of the manufacturer, hardware platform, operating system, etc. Projection device 4 may be for example a color liquid crystal display (LCD) projector. An LCD projector has one or more small LCD panels controlled by electronic circuitry which receives the electronic slide data from computer workstation 3 over a cord or cable 5 and creates an image of the slide on the panel. A light source within projector 4 illuminates the panel, and a lens assembly projects the images on a projection screen or a nearby wall. Various connectors or adapters may be employed to interconnect computer workstation 3 and projection device 4. The system can also provide for wireless transmission of the image data. Instead of a projection device, the presentation system could alternatively utilize one or more display units such as a computer monitor or television, e.g., a cathode-ray tube (CRT), LCD panel, or plasma screen.

Computer workstation 3 executes the presentation software program that controls the image data sent to projection device 4, and this software program can also be used to create and manage the electronic slides. Presentation editors such as Lotus Freelance™ include graphic and multimedia capabilities that allow the user to enter text and symbols with various fonts and draw original artwork, as well as import presentation features into an electronic slide. In this regard, the term "slide" as used in conjunction with electronic images is not necessarily limited to a static picture, but can further incorporate moving pictures and/or sound tracks in the form of electronic computer files such as MPEG or MP3 files.

A generalized electronic slideshow 6 is shown in FIG. 1, and includes four slides. Some presentation software programs allow the user to embed a link in a slide that can be used to directly pull up another image in an associated slide, i.e., by clicking on the link using a graphical pointing device (mouse), but electronic presentations are typically serial in nature to simplify the presentation by allowing the presenter to easily click a single button and sequentially step through each slide. The presentation software thus orders the slides by number, although this order can be changed using the management features of the presentation editor. The presentation editor can also be used to insert additional slides or delete a slide from a presentation. The presentation containing all of the slides is stored as a computer file on the permanent storage media (e.g., hard disk) of computer workstation 3.

Electronic presentations have several advantages over earlier systems such as slide carousel projectors and overhead projectors. Since there is no "hard" media required for an electronic presentation (i.e., the slide emulsion film or the overhead projection transparency), there is no need to learn photographic or lithographic techniques for such rendering of the images. The presentation software program makes it easy for nearly anyone to create and modify slides, and state-of-the-art presentation editors allow the design of remarkably complex productions. Moreover, the entire presentation can be carried around on pocket-sized media, such as a magnetic or optical diskette or a flash memory card, or be easily transmitted over a network such as the Internet. If computer workstation 3 is a laptop or notebook computer, then the complete presentation system 2 becomes very compact and portable.

There are, however, certain disadvantages of modern electronic presentations in relation to the flexibility afforded during the presentation, particularly as compared to the older slide carousel projectors and overhead projectors. One common problem with presentations is how to easily adapt them as appropriate for the current audience. For example, a presentation on a technical subject might have been somewhat simplified with many complex details omitted from the slides, but if this presentation is shown at a technical seminar with knowledgeable participants, then the presentation may be criticized as lacking sufficient information. On the other hand, if this same presentation subject were drawn out into a long, complicated set of slides, it would be unsuitable for a crowd of lay people. Slides in a carousel can easily and quickly be removed, added, or switched around in a different order to accommodate the whims of the audience, and overhead projection transparencies can similarly be manipulated without much trouble, but modification of an electronic presentation requires more effort by interacting with computer workstation 3 and can make the presenter look clumsy or inept if there is not much time available to consider and make the changes to the presentation content.

Another common situation occurs when a presenter is told in advance that she will have ample time for her presentation (say, an hour), but then due to bad timing by earlier presenters or other factors the presenter is actually given a much shorter amount of time to carry out the presentation (say, twenty minutes). This harsh constraint on the presentation can leave the presenter confused as well as aggravated. With a slide carousel or overhead projector, it is again a simple matter to just omit certain slides or transparencies, but it takes more time for the electronic slides to be considered and removed from the electronic presentation via computer workstation 3. The alternative is simply stepping through each slide quickly during the electronic presentation without commenting at all on most of the slides, which can lead to an incoherent recollection of the presentation and reflect poorly on the presenter.

In light of the foregoing, it would be desirable to devise an improved method to allow a presenter to easily modify or adapt a presentation according to the specific, current circumstances. It would be further advantageous if the method could impart greater flexibility regarding both the content and timing of the presentation.

SUMMARY OF THE INVENTION

It is therefore one object of the present invention to provide an improved method of carrying out electronic presentations.

It is another object of the present invention to provide such a method which allows the presenter to easily adjust the content or timing of an electronic presentation.

It is yet another object of the present invention to provide a method of generating an electronic presentation such that it can be scaled or adjusted according to one or more constraints.

The foregoing objects are achieved in a method of creating an electronic presentation, by including a plurality of electronic slides as part of a single presentation, assigning one or more presentation constraint parameters to at least one of the electronic slides, and generating a sequence for presenting less than all of the plurality of electronic slides based on the presentation constraint parameters. In this manner, different sequences can be generated using different presentation constraint parameters that are assigned to the electronic slides. For example, a first electronic slide could be included in a first sequence, and a second electronic slide (or multiple slides) can be substituted for the first electronic slide in a second sequence. The sequence can be generated by adjusting a scalable constraint associated with the presentation constraint parameters to determine which electronic slides to include. In the exemplary implementation, the presentation constraint parameters include a time factor and a content level which are assigned to the electronic slides. The presentation can further be fine tuned on-the-fly by adjusting the one or more presentation constraint parameters after displaying at least one of the electronic slides in the sequence, and generating another sequence of the plurality of electronic slides based on the adjusted presentation constraint parameters.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
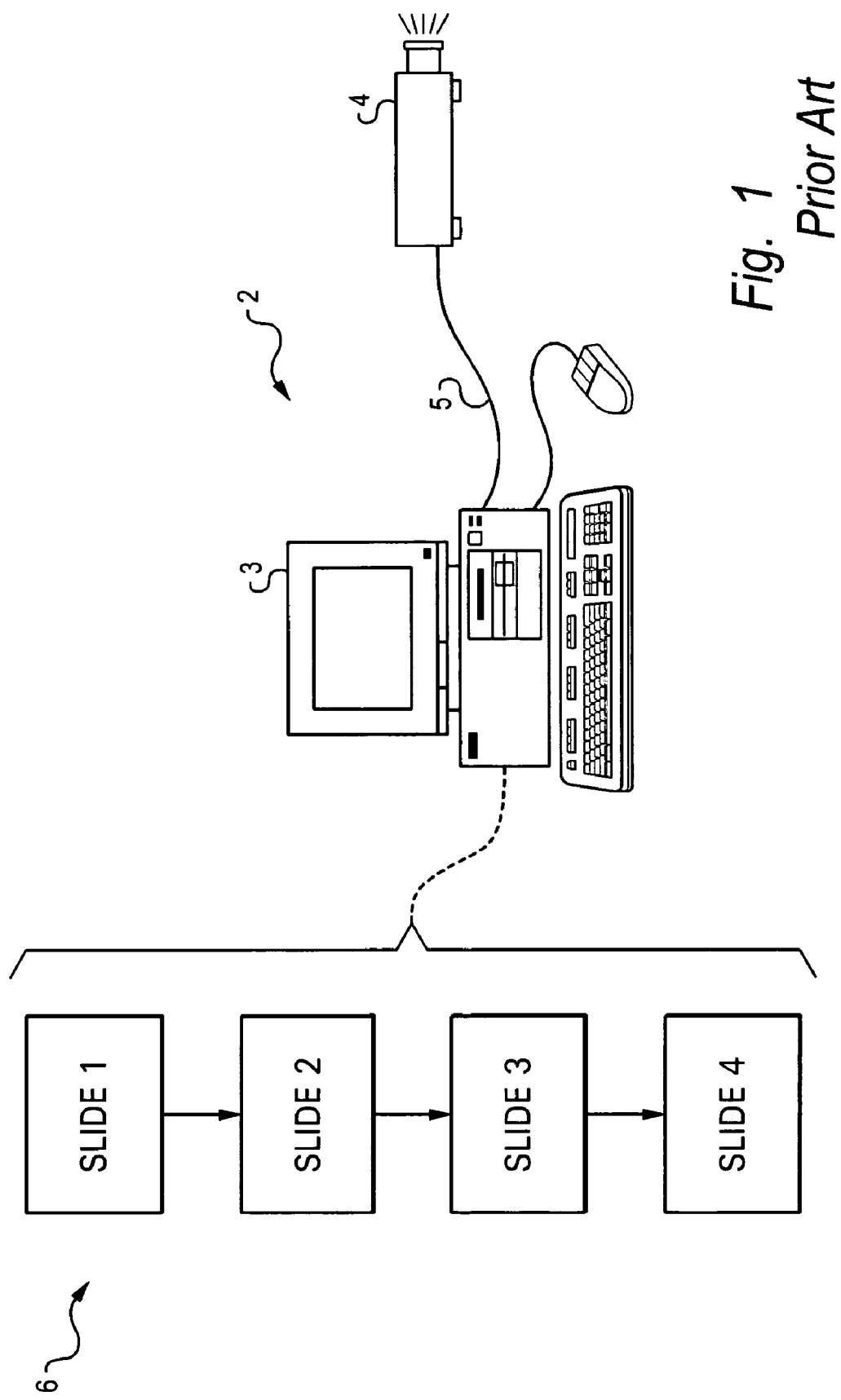
FIG. 1 is a pictorial representation of a conventional electronic presentation system including a projection device and a computer workstation which stores a series of electronic slides.
Figure 2:
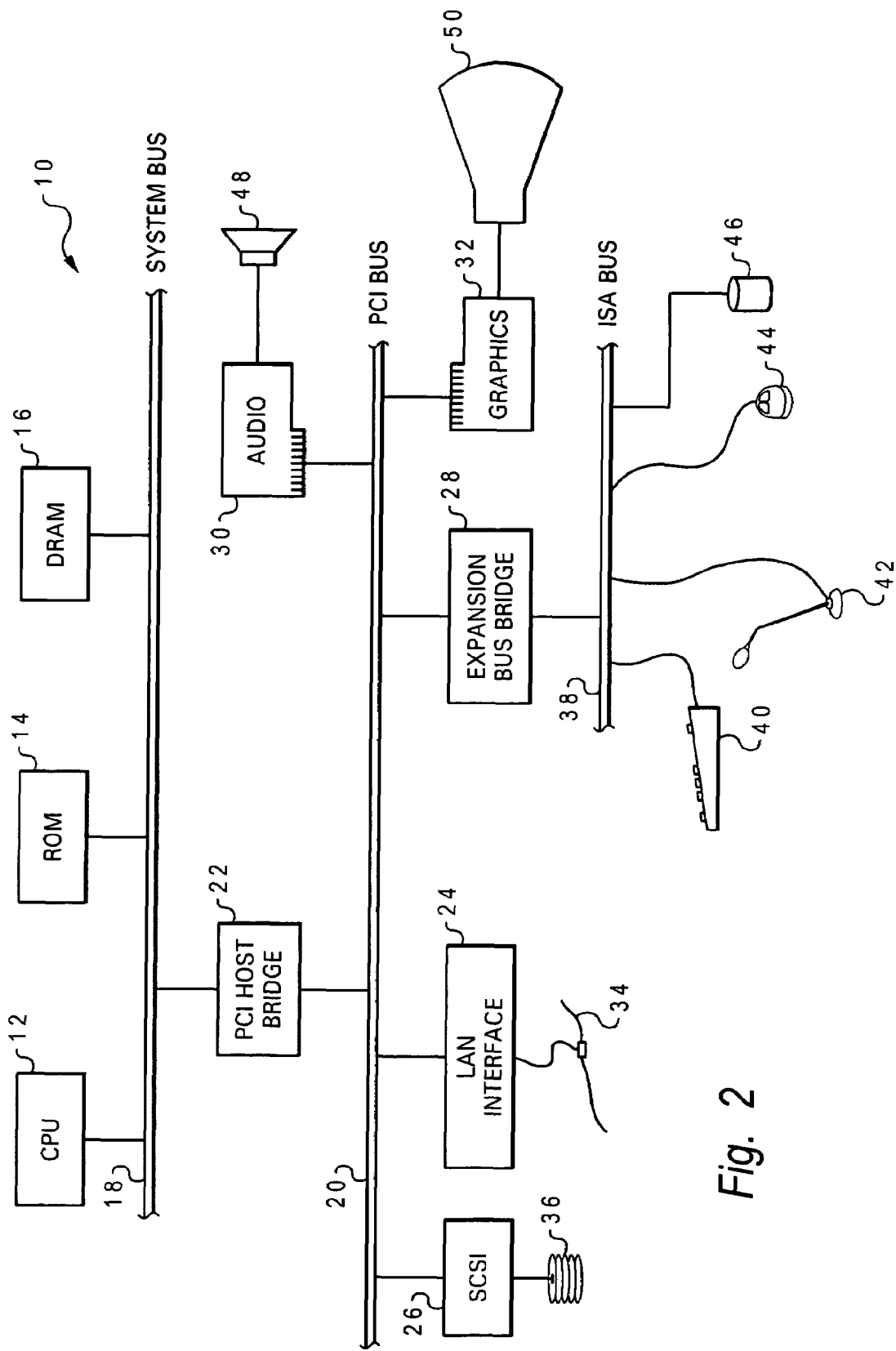
FIG. 2 is a block diagram of a computer system programmed to carry out electronic presentations in accordance with one implementation of the present invention.

The present invention provides a method of generating and presenting electronic presentations which allows the presenter to effortlessly adjust the presentation according to one or more constraints such as timing and content. The invention utilizes a program application such as a presentation editor, as explained further below, which is executed on a data processing system or computer. FIG. 2 depicts one embodiment 10 of a computer system programmed to generate and carry out electronic presentations in accordance with one implementation of the present invention. System 10 includes a central processing unit (CPU) 12 which carries out program instructions, firmware or read-only memory (ROM) 14 which stores the system's basic input/output logic, and a dynamic random access memory (DRAM) 16 which temporarily stores program instructions and operand data used by CPU 12. CPU 12, ROM 14 and DRAM 16 are all connected to a system bus 18. There may be additional structures in the memory hierarchy which are not depicted, such as on-board (L1) and second-level (L2) caches.

CPU 12, ROM 14 and DRAM 16 are also coupled to a peripheral component interconnect (PCI) local bus 20 using a PCI host bridge 22. PCI host bridge 22 provides a low latency path through which processor 12 may access PCI devices mapped anywhere within bus memory or I/O address spaces. PCI host bridge 22 also provides a high bandwidth path to allow the PCI devices to access DRAM 16. Attached to PCI local bus 20 are a network adapter 24, a small computer system interface (SCSI) adapter 26, an expansion bus bridge 28, an audio adapter 30, and a graphics adapter 32. Network adapter 24 may be used to connect computer system 10 to an external computer network 34, such as a local area network (LAN) or the Internet. Small computer system interface (SCSI) adapter 26 is used to control high-speed SCSI disk drive 36. Disk drive 36 stores the program instructions and data in a more permanent state, including the program which embodies the present invention as explained further below. Expansion bus bridge 28 is used to couple an industry standard architecture (ISA) expansion bus 38 to PCI local bus 20. As shown, several user input devices are connected to ISA bus 38, including a keyboard 40, a microphone 42, and a graphical pointing device (mouse) 44. Other devices may also be attached to ISA bus 38, such as a CD-ROM drive 46. Audio adapter 30 controls audio output to a speaker 48, and graphics adapter 32 controls visual output to a display monitor 50, to allow the user to control the presentation process as taught herein. Additional interconnections can be provided on PCI bus 20 or ISA bus 38 for other types of peripheral devices, including serial, parallel and universal serial bus (USB) ports which can be used to communicate with projection devices or auxiliary display devices.

While the illustrative implementation provides the program instructions embodying the present invention on disk drive 36, those skilled in the art will appreciate that the invention can be embodied in a program product utilizing other computer-readable media. Those skilled in the art will also appreciate that the same functionalities described herein for computer system 10 can be integrated with a projection or display device in a special-purpose or limited use manner to provide a more compact, stand-alone presentation system. Additional details of such projection or display devices are beyond the scope of the present invention but will become apparent to those skilled in the art upon reference to this disclosure.

Computer system 10 carries out program instructions for presentation generation in accordance with one or more of the implementations discussed in detail below. The invention is applicable to a wide variety of presentation types and document editors including graphics and multimedia applications. Accordingly, practice of the invention may include the use of conventional document application features in addition to the inventive concept disclosed herein. The details of such applications (i.e., presentation editors) will become readily apparent to those skilled in the art upon reference to this disclosure.

Computer system 10 is programmed to facilitate the creation of an electronic presentation by associating different constraint parameters with different electronic slides in the presentation. In the exemplary implementation illustrated in FIGS. 3-4, a presentation editor running on computer system 10 allows an author to compose a single electronic presentation having multiple, alternative presentations which can be adjusted according to time or content.

Figure 3:
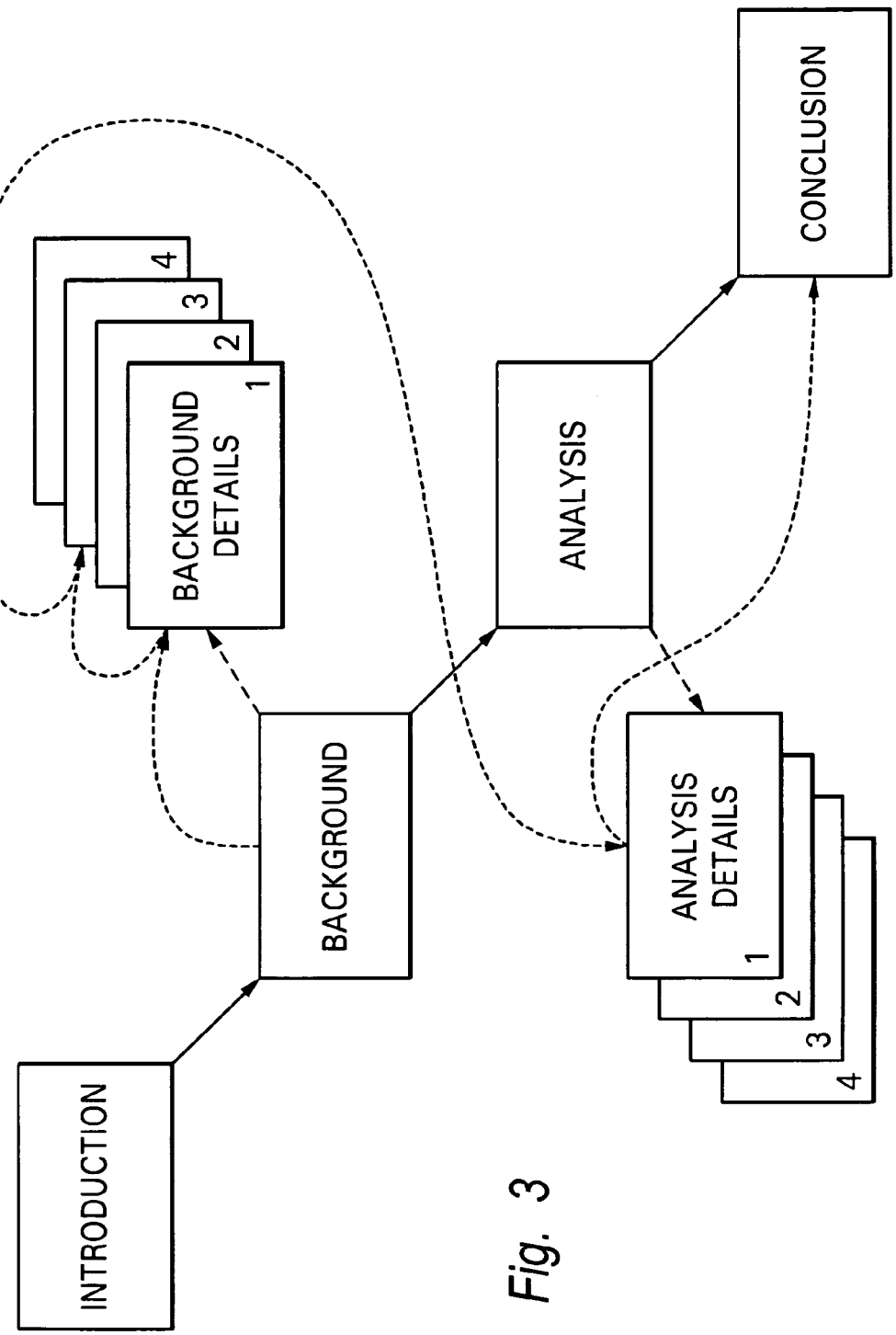
FIG. 3 is a pictorial representation of a single electronic presentation constructed in accordance with the present invention, having multiple alternative presentations which can be adjusted according to time or content.

With reference now to FIG. 3, there is depicted one example of a presentation designed in accordance with the present invention. The entire presentation includes a total of twelve slides, but eight of these slides are "optional," that is, they are to be included in the actual presentation only according to the particular circumstances such as the technical ability of the audience and the amount of time available. A complete presentation using all of the slides might take, for example, around one hour, while an abbreviated version which includes only the four main slides "Introduction," "Background," "Analysis" and "Conclusion" might take as little as 15 minutes. The "Introduction" and "Conclusion" slides are simple, that is, they are single pages that have no further embellishments, but the "Background" and "Analysis" slides are complex, meaning there have supplemental or auxiliary pages that contain additional details regarding those two topics. The auxiliary pages can be considered as stacked in a multi-level structure so as to give a content or time depth to the presentation, as well as an order of the auxiliary pages. Thus, if a complete presentation were made using all of the slides, the order would step through all of the "Background Details" pages sequentially, and then step through all of the "Analysis Details" pages sequentially.

Figure 4A:
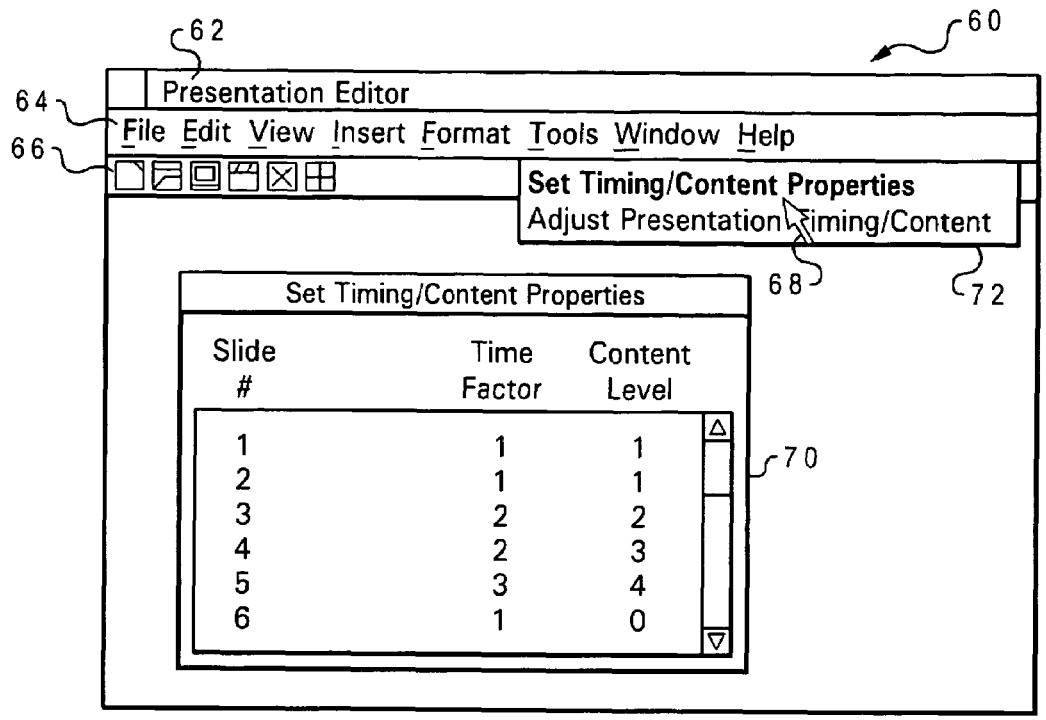
FIG. 4A is an elevational view of a presentation editor application as displayed on a computer screen, depicting how different slides in an electronic presentation can be assigned constraint parameters in accordance with one implementation of the present invention.
Figure 4B:
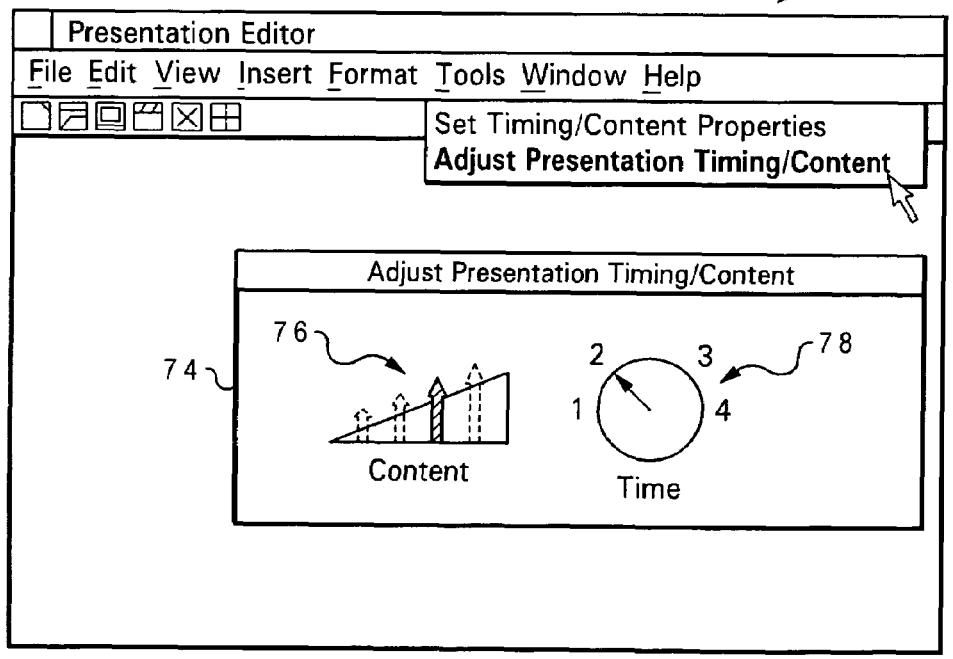
FIG. 4B is an elevational view of the presentation editor application as displayed on a computer screen, depicting how an electronic presentation can be adjusted based on time and content in accordance with one implementation of the present invention.

When creating the presentation, the author can assign one or more constraint parameters to any of the electronic slides in order to establish the content/time depth of the slide. FIGS. 4A-4B illustrate one embodiment of a user interface 60 of the presentation editor that is displayed on monitor 50 as the presentation is generated by computer system 10 under control of the presenter, which can be used to set the constraint parameters, in this case, a content level or a time factor. User interface 60 may include general features familiar to computer users such as a title bar 62, a menu bar 64 having various commands which can be executed using keyboard 40 or mouse 44 to display additional pull-down menus, and a button bar 66 having several graphical buttons with icons that allow the user to more simply effectuate a command with a single click of mouse 44 as it controls the graphical pointer 68 on display monitor 50.

As seen in FIG. 4A, prior to performing the presentation, the user can set the content level and time factor for each slide via a dialog box 70 which is displayed when the user activates the "Set Timing/Content Properties" command in a pull-down menu 72 of menu bar 64. Dialog box 70 has different fields for manually entering the constraint parameters, which are to be determined subjectively by the presenter. In the illustrative implementation, setting a time factor or content level to a value of "1" indicates that the associated slide is to be included in the most basic (brief) version of the presentation, while higher numbers indicate the content or time depth. For example, a slide with a time factor of 2 will be used if more than the minimum time is available but there is insufficient time to have a full presentation, while a content level of 4 might indicate that the associated slide would be used only in the full presentation with all technical details. A value of "0" can be used to indicate that the associated slide is to be utilized only for the most basic presentation depth, and that it is not to be used at all for deeper level presentations, that is, one or more other slides will effectively substitute for (replace) that slide as content or time constraints relax.

Once the constraint parameters have been entered for a presentation, it is an easy matter for the presenter to modify the presentation according to the particular circumstances at hand, by simply setting the appropriate content or time depth. FIG. 4B depicts another dialog box 74 that is displayed with user interface 60 when the user activates the "Adjust Presentation Timing/Content" command in pull-down menu 72. Dialog box 74 has graphical representations of the adjustable constraint parameters including a slider feature 76 and a knob feature 78 that allow for real-time adjustment of the presentation based on the content and time depth. In this example, each control feature has four settings. Slider 76 has an arrow which may be positioned in one of four different locations along a triangle, with the arrow heights progressively taller from left to right to indicate more content being included, i.e., the shortest arrow setting corresponds to the least detailed version of the presentation, and the tallest arrow setting corresponding to the most technical version of the presentation. Knob 78 has a pointer that flips from settings numbered one through four, with the first setting corresponding to the briefest version of the presentation and the fourth setting corresponding to the most verbose version.

In this manner, the user can quickly and intuitively adjust the presentation based on any last-minute changes in the audience or schedule. If the presenter learns that the audience will include a more technical caliber of viewers than was expected, slider 76 can be adjusted upward to instantly make the presentation more complex, but if the amount of time allocated for the presentation is shortened, the presenter can adapt without difficulty by adjusting knob 78 to curtail the number of slides shown.

Referring again to FIG. 3, a dotted line path is used to indicate the sequence of one possible permutation of the multiple, alternative presentations available based on particular constraint settings. This example path corresponds to a presentation which is somewhat technical in nature (i.e., between the simple and complex extremes), and which is fairly short in time although not as short as the minimum length presentation. Accordingly, after the "Introduction" and "Background" slides, the presentation proceeds with the "Background Details 1" and "Background Details 3" slides. These slides are included for the additional technical details, but not all of the background detail slides are used (i.e., "Background Details 2" and "Background Details 3" are omitted from the path) due to the timing constraints. After showing the "Background Details 3" slide, the presentation continues with the "Analysis Details 1" slide. The main "Analysis" slide is skipped because the "Analysis Details 1" substitutes for it at this level of technical content, and again the additional analysis details slides are not used due to timing constraints. This customized presentation thus goes from the "Analysis Details 1" slide directly to the "Conclusion" slide.

Figure 5:
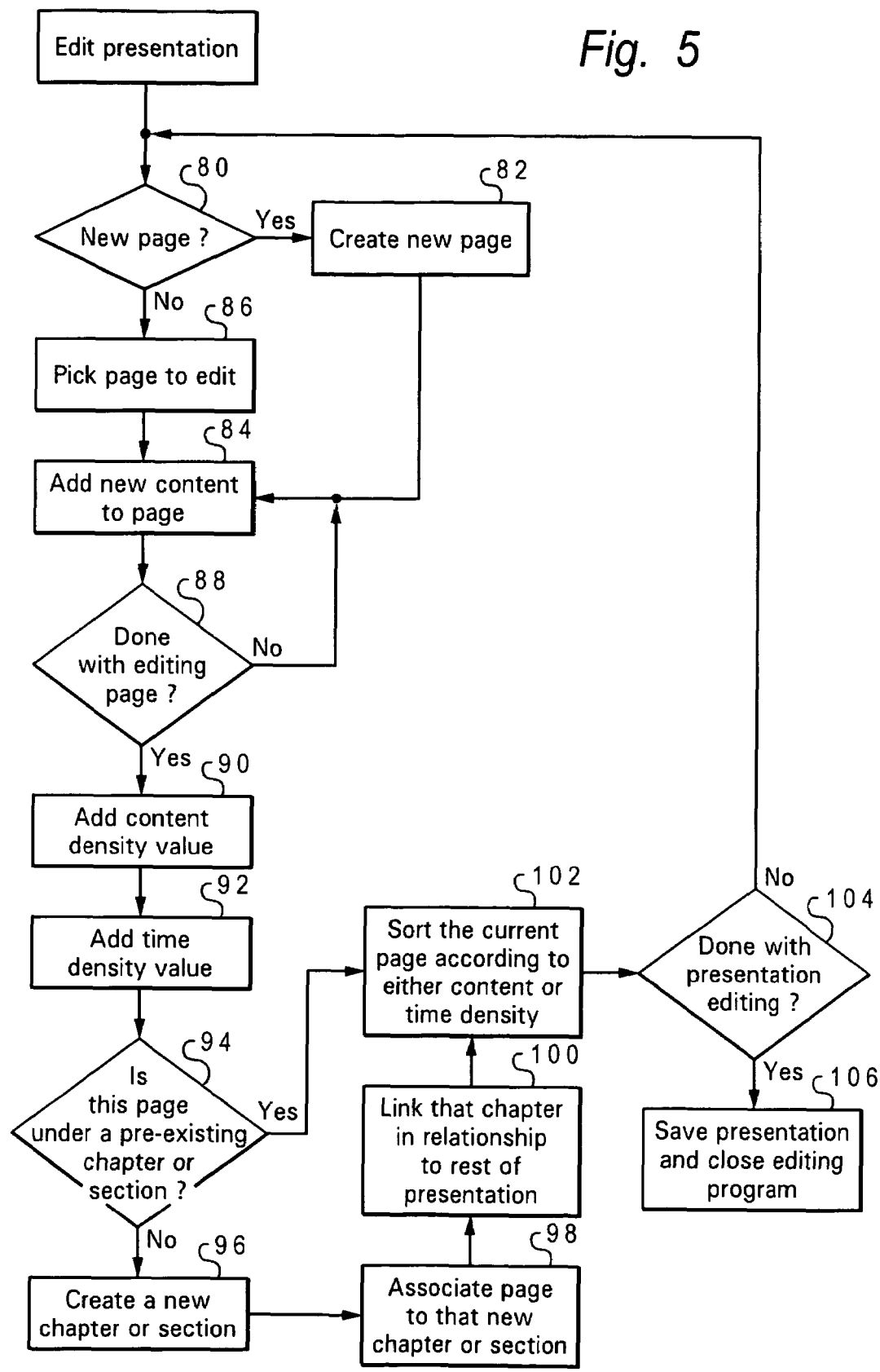
FIG. 5 is a chart illustrating the logical flow of electronic presentation generation with constraint parameters in accordance with one implementation of the present invention.
Figure 6:
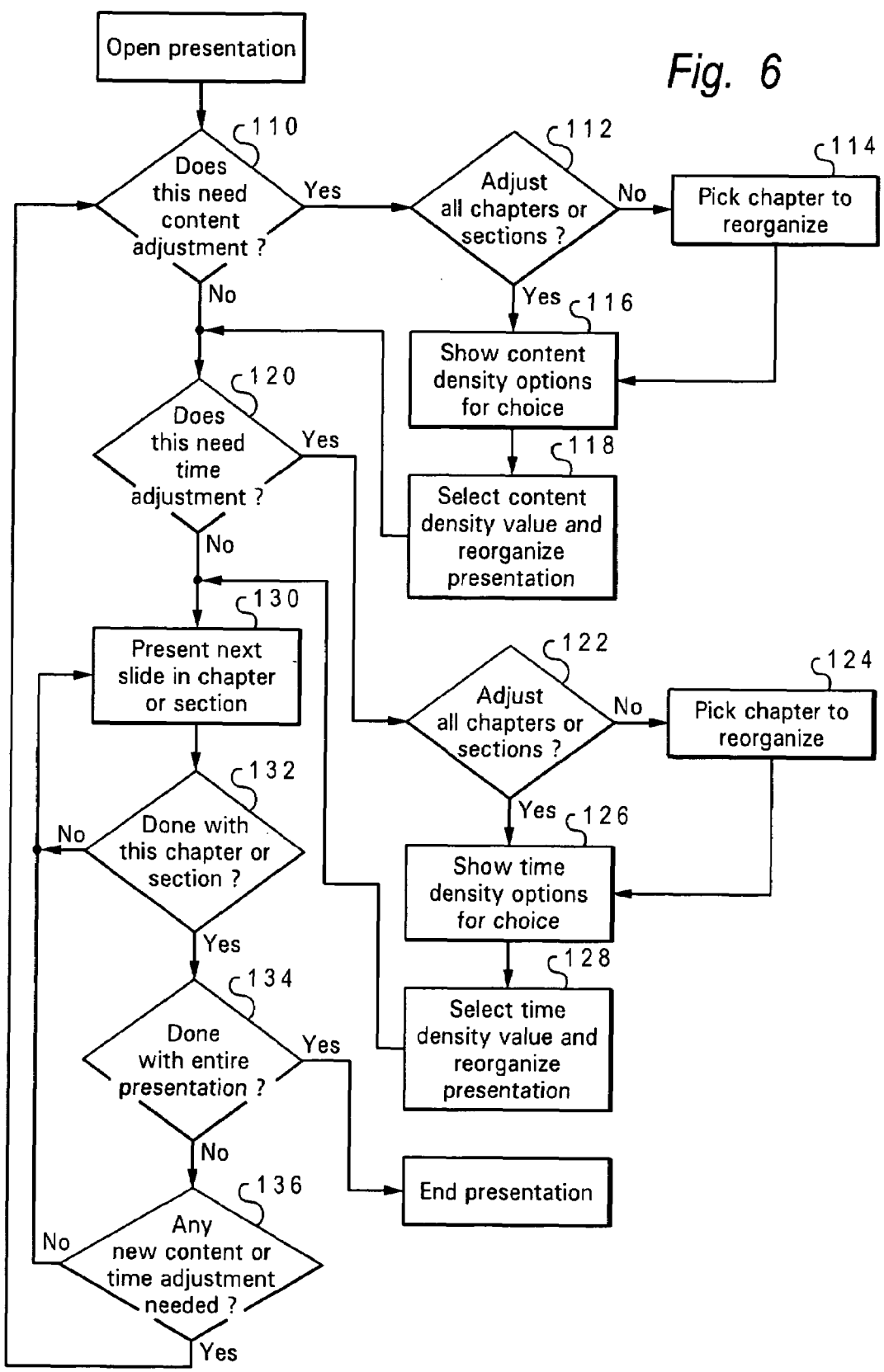
FIG. 6 is a chart illustrating the logical flow for carrying out the generated presentation in accordance with one implementation of the present invention.

The present invention may be further understood with reference to the flow charts of FIGS. 5 and 6. FIG. 5 relates to the creation or editing or a presentation, and begins by determining if a new page is to be created (80). If so, the presentation software creates a new page instance (82), and the user adds new content to the page (84). If the user is not creating a new presentation but instead is editing an existing presentation, then one of the pages is selected for editing (86), and the content of the page is updated (84) until the page editing is complete (88). The constraint parameters are then assigned, i.e., the content density value (90) and the time density value (92). The page is examined to see if it is part of a pre-existing section (chapter) of the presentation (94). If not, a new section is created (96) and the edited page is associated with the new section (98). For example, the "Background Details" slides shown in FIG. 3 are all in the "Background" section. The new section is then linked (ordered) in relation to any other sections of the presentation (100), and the current page is sorted within its section according to either content or time density (102). Returning to step 94, if the page is already part of a pre-existing section, the process skips directly to step 102 to re-sort the current page according to any new content or time density values. Thereafter, the program determines whether additional pages are to be added or edited (104). If so, the process repeats iteratively at step 80, and if not, the presentation is complete and is saved before closing the editing program (106).

FIG. 6 illustrates the presentation process itself which, in this exemplary embodiment, begins by inquiring whether the presentation calls for any content adjustment (110). The program can further ask the user if all sections in the presentation are to be adjusted (112). If not, then the specific section to be reorganized is selected (114), and the process continues by showing the content density values for the selected sections (116). The content density values are then set as desired according to the particular circumstances of the next instance of the presentation to be given, and the presentation is re-organized based on those settings (118). The process next inquires whether the presentation calls for any time adjustment (120). The program can again ask the user if all sections in the presentation are to be adjusted (122). If not, then the specific section to be reorganized is selected (124), and the process continues by showing the time density values for the selected sections (126). The time density values are then set as desired according to the particular circumstances of the next instance of the presentation to be given, and the presentation is re-organized based on those settings (128). The presentation can then commence with the display of the next slide as sorted according to the content and time density options (130). In this implementation, the user is offered the opportunity to further adjust the time/content parameters after each section is finished, to fine tune the presentation on-the-fly. Accordingly, step 130 is repeated iteratively for each slide in the current section (132), and then the program checks to see if the presentation has ended, i.e., if the current section is the final section of the presentation (134). If not, the user is asked whether further adjustment is needed (136). If further adjustment is desired, the process returns to step 110 and repeats the content and time density value entries, and then continues at step 130 with the display of the first slide to be shown in the next section. If a section is completed at step 134 and no fine tuning of the remaining presentation is desired, the process iteratively repeats at step 130 until every section of the presentation has been shown.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the constraint parameters used in the illustrative embodiment for adjusting the presentation include only time and content, there are other dimensions of a presentation that could be similarly used such as allowing different levels of audience participation (e.g., question & answer), adjusting the use of text versus artwork in slides, etc. It is therefore contemplated that such modifications can be made without departing from the spirit or scope of the present invention as defined in the appended claims.

What is claimed is:

1. A method of creating an electronic presentation, comprising: including a plurality of electronic slides as part of a single presentation;
   selectively assigning two or more presentation constraint parameters having different values to at least two of the electronic slides, wherein the two or more presentation constraint parameters include a time factor and a content level;
   adjusting scalable constraints associated with the time factor and content level using graphical representations of the scalable constraints having multiple settings; and
   automatically generating a sequence for presenting less than all of the plurality of electronic slides, where slides included in the sequence are based on which slides have an assigned time factor and content level within the adjusted scalable constraints.

2. The method of claim 1 wherein different presentation constraint parameters are assigned to at least two of the electronic slides, and the sequence is a first sequence, and further comprising generating a second sequence for presenting less than all of the plurality of electronic slides based on the presentation constraint parameters, the second sequence being different from the first sequence.

3. The method of claim 2 wherein a first electronic slide is included in the first sequence, and a second electronic slide is substituted for the first electronic slide in the second sequence.

4. The method of claim 1 further comprising the steps of:
   adjusting the two or more presentation constraint parameters after displaying at least one of the electronic slides in the sequence; and
   generating another sequence of the plurality of electronic slides based on the two or more adjusted presentation constraint parameters.

5. The method of claim 1 wherein at least one of the electronics slides is assigned a presentation constraint parameter which indicates that the at least one electronic slide is to be included only in a most basic presentation, and is not to be used at all for deeper level presentations.

6. A computer system comprising:
   means for processing program instructions;
   a display device controlled by said processing means;
   a memory device accessible by said processing means; and
   program instructions residing in said memory device for including a plurality of electronic slides as part of a single presentation, selectively assigning two or more presentation constraint parameters having different values to at least two of the electronic slides, wherein the two or more presentation constraint parameters include a time factor and a content level, adjusting scalable constraints associated with the time factor and content level using graphical representations of the scalable constraints having multiple settings, and automatically generating a sequence for presenting less than all of the plurality of electronic slides, where slides included in the sequence are based on which slides have an assigned time factor and content level within the adjusted scalable constraints.

7. The computer system of claim 6 wherein the sequence is a first sequence, and said program instructions are further for assigning different presentation constraint parameters to at least two of the electronic slides, and generating a second sequence for presenting less than all of the plurality of electronic slides based on the presentation constraint parameters, the second sequence being different from the first sequence.

8. The computer system of claim 7 wherein a first electronic slide is included in the first sequence, and a second electronic slide is substituted for the first electronic slide in the second sequence.

9. The computer system of claim 6 wherein said program instructions are further for adjusting the two or more presentation constraint parameters after displaying at least one of the electronic slides in the sequence; and generating another sequence of the plurality of electronic slides based on the two or more adjusted presentation constraint parameters.

10. The computer system of claim 6 wherein at least one of the electronics slides is assigned a presentation constraint parameter which indicates that the at least one electronic slide is to be included only in a most basic presentation, and is not to be used at all for deeper level presentations.

11. A computer program product comprising:
a computer-readable medium; and
program instructions residing in said medium for including a plurality of electronic slides as part of a single presentation, selectively assigning two or more presentation constraint parameters having different values to at least two of the electronic slides, wherein the two or more presentation constraint parameters include a time factor and a content level, adjusting scalable constraints associated with the time factor and content level using a graphical representation of the scalable constraints having multiple settings, and automatically generating a sequence for presenting less than all of the plurality of electronic slides, where slides included in the sequence are based on which slides have an assigned time factor and content level within the adjusted scalable constraints.

12. The computer program product of claim 11 wherein the sequence is a first sequence, and said program instructions are further for assigning different presentation constraint parameters to at least two of the electronic slides, and generating a second sequence for presenting less than all of the plurality of electronic slides based on the presentation constraint parameters, the second sequence being different from the first sequence.

13. The computer program product of claim 12 wherein a first electronic slide is included in the first sequence, and a second electronic slide is substituted for the first electronic slide in the second sequence.

14. The computer program product of claim 11 wherein said program instructions are further for adjusting the two or more presentation constraint parameters after displaying at least one of the electronic slides in the sequence; and generating another sequence of the plurality of electronic slides based on the two or more adjusted presentation constraint parameters.

15. The computer program product of claim 11 wherein at least one of the electronics slides is assigned a presentation constraint parameter which indicates that the at least one electronic slide is to be included only in a most basic presentation, and is not to be used at all for deeper level presentations.

* * * * *